United States Patent
Anantharamaiah et al.

(10) Patent No.: US 7,894,434 B2
(45) Date of Patent: Feb. 22, 2011

(54) METHOD, APPARATUS, AND SYSTEM FOR CAPTURING TRAFFIC STATISTICS BETWEEN TWO SITES OF MPLS BASED VPN

(75) Inventors: Prasanna Anantharamaiah, Karnataka (IN); Harish Kumar Aethugonahalli Puttahariyappa, Karnataka (IN); Venkateswara Reddy Mandem Laxmi, Electronic (IN); Shivananda Somayaji, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 782 days.

(21) Appl. No.: 11/428,410

(22) Filed: Jul. 3, 2006

(65) Prior Publication Data

US 2008/0002697 A1  Jan. 3, 2008

(51) Int. Cl.
  *H04L 12/28* (2006.01)

(52) U.S. Cl. .................... 370/392; 370/235; 370/401; 709/223; 709/244

(58) Field of Classification Search ............ 370/392
See application file for complete search history.

(56) References Cited

U.S. PATENT DOCUMENTS

| | | | |
|---|---|---|---|
| 2005/0022189 A1* | 1/2005 | Proulx et al. | 718/100 |
| 2006/0002289 A1* | 1/2006 | Menon et al. | 370/216 |
| 2006/0098654 A1* | 5/2006 | Tingle et al. | 370/389 |
| 2006/0168279 A1* | 7/2006 | Lee et al. | 709/230 |
| 2006/0190570 A1* | 8/2006 | Booth et al. | 709/220 |
| 2007/0047557 A1* | 3/2007 | Martini et al. | 370/395.53 |
| 2007/0258372 A1* | 11/2007 | Nadeau et al. | 370/235 |

* cited by examiner

*Primary Examiner*—Salman Ahmed
*Assistant Examiner*—Nicholas Sloms

(57) ABSTRACT

A technique for effectively capturing site-to-site traffic statistic without significantly affecting the performance of a router in an MPLS-VPN service network is disclosed. In one example embodiment, this is accomplished by computing source PE IP and source PE interface from each flow record received at a destination PE router to identify an associated source VPN site.

16 Claims, 3 Drawing Sheets

METHOD, APPARATUS, AND SYSTEM FOR CAPTURING TRAFFIC STATISTICS BETWEEN TWO SITES OF MPLS BASED VPN

TECHNICAL FIELD OF THE INVENTION

The present invention relates generally to MPLS (Multi-Protocol Label Switching) based VPNs (Virtual Private Networks), and more particularly relates to capturing and monitoring traffic data within the MPLS-VPNs.

BACKGROUND OF THE INVENTION

With the growing popularity of the Internet and networks in general, there is a trend towards centralized network services, and centralized network service providers. To be profitable, however, network service providers need to constantly maintain and if possible expand their customer base and their profits. Since leased line services are coming under increased competition, profit margins have been decreasing for their providers. Thus, an increasing number of providers are trying to attract small and medium sized businesses by providing network with value added services and a centralized network management system. Network providers are offering VPNs to interconnect various customer sites that are geographically dispersed. VPNs are of great interest to both provider and to their customers because they offer privacy and cost efficiency through network infrastructure sharing.

Today, a virtual private network (VPN) virtually implementing, e.g., a company network on an IP (Internet Protocol) network is attracting increasing attention. Particularly, a MPLS-VPN using MPLS easily provides a VPN solution for supporting private addresses while securing customer data.

In general, customers of MPLS/VPN services desire that they are charged based on VPN site usage, instead of fixed monthly charges that are based on number of sites within VPN and other similar billing policies. Typically, MPLS based routers have capabilities to capture the traffic data at the interfaces. When an IP packet arrives at a MPLS/VPN service provider network, these IP packets are encapsulated with MPLS labels by the ingress router. These packets then traverse through the MPLS-VPN network to reach the egress router based on the traffic-engineering patterns configured in the core network. Such flow records are then captured at the egress interfaces by a Usage Mediation Subsystem and aggregated into Usage Data Records (UDRs), which can later be used for billing purposes based on traffic patterns.

The egress interface of the Provider Edge (PE) router from where the flow records are collected provides information about the "destination VPN site" and the "VPN" that the traffic belongs. However, using source customer edge (CE) IP or destination CE IP obtained from the UDRs; there are no straight forward ways to compute the source PE IP address and the source PE ingress interface information. Also, in a deployment of the MPLS/VPN network, explicit traffic engineering Label Switch Path (LSP) tunnels are not always created, which could provide information about the source PE router information for a flow record. However, such LSP tunnels are generally not available. In a true routed-domain network, extensive computation and the knowledge of how MPLS works is required to compute the source PE IP information for each packet exiting the MPLS network.

Current techniques to monitor traffic statistics capture both ingress and egress data flow at each interface. Also, these techniques are designed to capture both the ingress and egress traffic data at each interface configured as a site of a VPN. The flow record captured at each site is based on time to arrive at source/destination. This flow record capturing scheme can significantly affect performance of a router. In addition, they are very complex to implement in usage mediation applications. Generally, only egress flow record is captured at MPLS-VPN interface for accounting purposes. However, these techniques require capturing data associated with both ingress and egress flow records and can result in capturing duplicate records, which can significantly increase central processing unit (CPU) utilization of routers. Further, these techniques result in huge processing overheads in terms of correlating records. Furthermore, processing of such flow records from all sources may have to be performed centrally, which can require very high end servers.

SUMMARY OF THE INVENTION

According to an aspect of the subject matter, there is provided a method for capturing traffic data between two sites of a MPLS-VPN network by computing a source PE IP address and a source PE interface name for each flow record received at a destination PE router, and identifying a source VPN site based on the computed source PE IP address and the source PE interface name for each flow record.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "MPLS-VPN service network" refers to a private network that enables private communications between two or more private networks over a shared MPLS network. The VPN can include multiple PE routers connected to the shared MPLS network and configured to dynamically distribute VPN information across the shared MPLS service network. The terms "between two sites" and "site-to-site" are used interchangeably throughout the document. Further, the terms "ingress" and "source" are used interchangeably throughout the document. Furthermore, the terms "egress" and "destination" are used interchangeably throughout the document. Also, the terms "UDR" and "flow record" are used interchangeably throughout the document.

The term "flow record" refers to a traffic record captured at an egress PE interface. The flow record includes a combination of seven key fields, such as Source IP address, destination IP address, source port number, destination port number, layer 3 protocol type, type of service byte and logical interface (ifIndex), and so on.

The technique includes computing a source PE IP address and a source PE interface name for each flow record received at a destination PE router in a MPLS-VPN network. The technique further includes identifying a source VPN site based on the computed source PE IP address and the source PE interface name for each flow record. In some embodiments, the source PE IP address and the source PE interface name for each flow record is computed by forming a VPN route database that includes a VPN site name, a PE router IP address, VPN routing information and interface name associated with each VRF name for each flow record by querying a VPN provisioning system database and an associated PE router. Each flow record is then dynamically updated with the source VPN site information by using the VPN route database.

Figure 1:
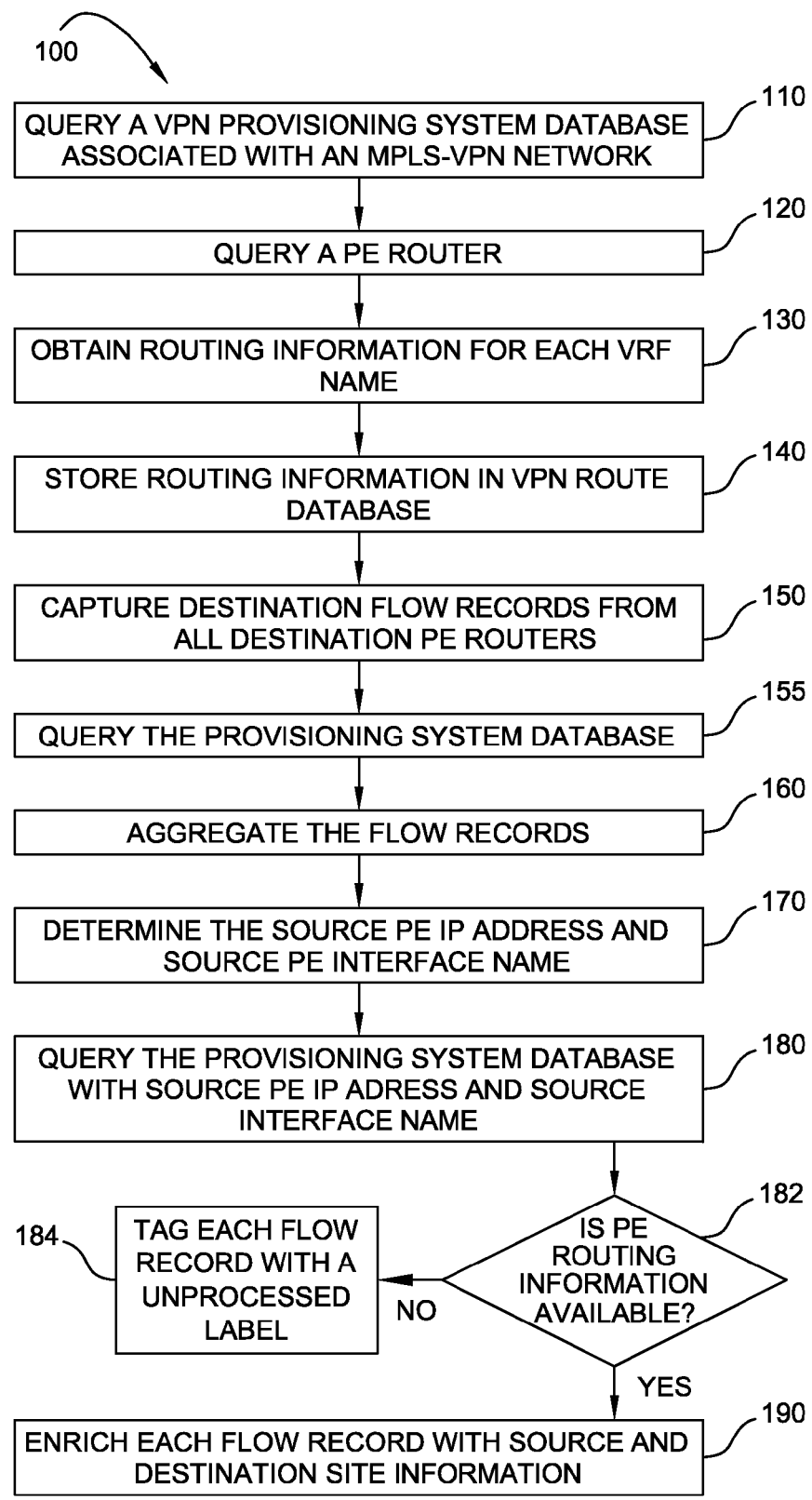
FIG. 1 is a flowchart illustrating a method for capturing site-to-site traffic data in an MPLS-VPN service network according to an embodiment of the present subject matter.

FIG. 1 illustrates an example method 100 for capturing site-to-site traffic data in a MPLS-VPN service network. At step 110, this example method 100 begins by querying a VPN provisioning system database via a VPN provisioning system to retrieve Virtual Route Forward (VRF) names and associated PE router IP addresses, VPN site names and PE interface name fields related to any desired VPNs. At step 120, the retrieved PE router IP address for each VRF name is queried to retrieve routing information associated with directly connected routes. At step 130, the VPN site name, the PE router IP address, the PE interface name and the VPN routing information associated with each VRF name is then obtained. At step 140, the obtained the VPN site name, the PE router IP address, the PE interface name and the VPN routing information associated with each VRF name is stored in the VPN route database.

At step 150, destination flow records from all destination PE routers associated with the MPLS-VPN network is captured by a first stage flow record processor via a flow record collector. At step 155, the VPN provisioning system database is queried using a destination PE IP address and a destination PE interface name associated with each captured flow record to retrieve associated destination VPN site name and VPN name. At step 160, the flow records are aggregated based on a source CE IP address and the retrieved destination VPN site name and the VPN name.

At step 170, the source PE IP address and the source PE interface name is determined from the VPN route database using source CE IP address and the retrieved VPN name. At step 180, the provisioning system database is queried using the source PE IP address and the source PE interface name to retrieve associated source VPN site name.

At step 182, the method 100 determines if routing information is available for each flow record. At step 190, each flow record is enriched by adding the associated source PE IP address, the destination PE IP address, the destination VPN site name, the source VPN site name, the source PE interface name and the destination PE interface name based on the determination at step 182. At step 184, each flow record is tagged with an unprocessed label if routing information is not available based on the determination at step 182. In some embodiments, all flow records that are tagged as unprocessed flow records are batch processed during a predetermined period to update with any available VPN site information.

Although the flowchart 100 includes steps 110-190 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Although the embodiments of the present invention are described in the context of non-distributed environment they can be very much implemented in the distributed environment as well.

Figure 2:
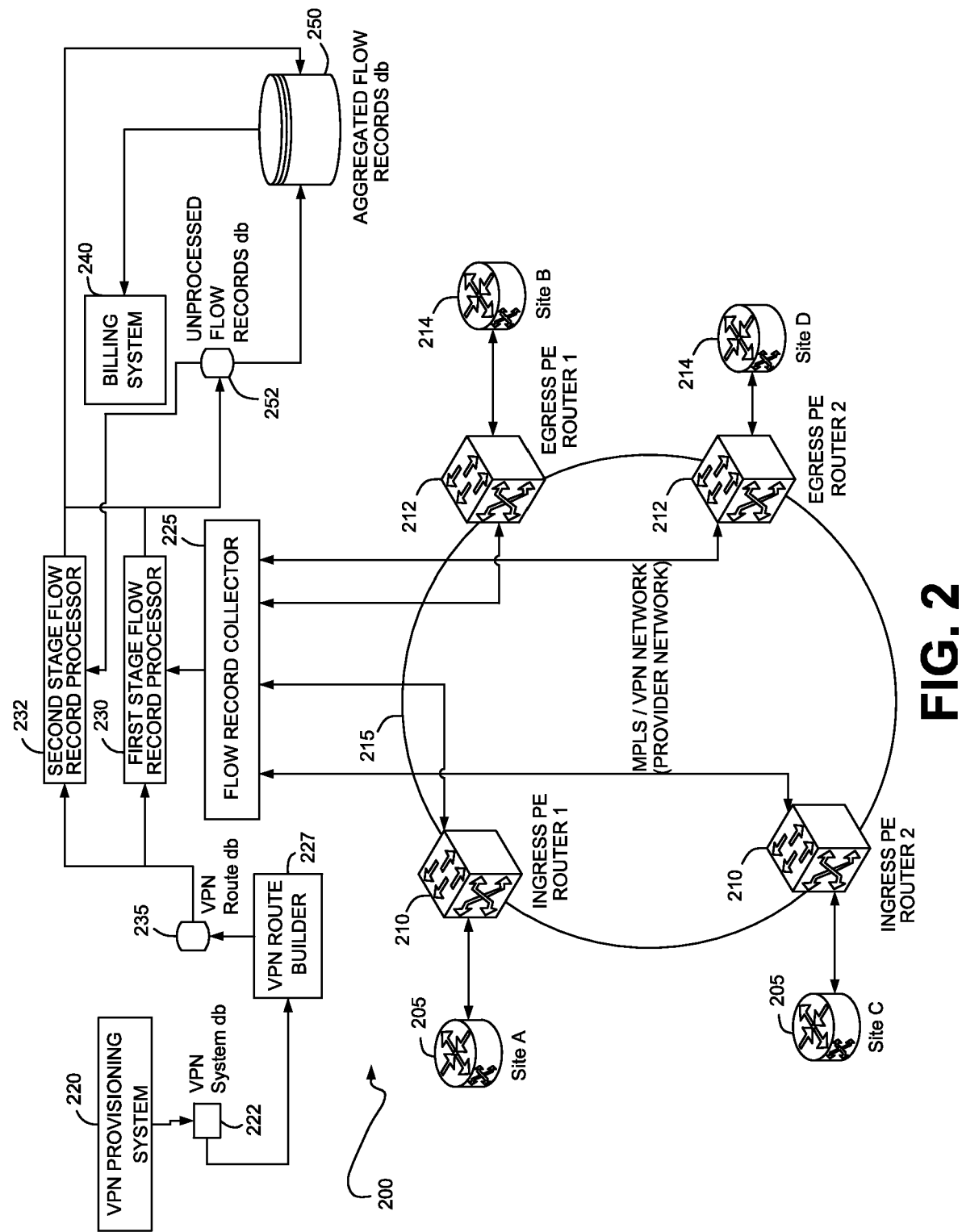
FIG. 2 is a block diagram illustrating an exemplary MPLS-VPN service network that captures site-to-site traffic data according to an embodiment of the present subject matter.

Referring now to FIG. 2, there is shown a block diagram 200 showing an exemplary MPLS-VPN service network 215 that captures site-to-site traffic data. As shown in FIG. 2, the MPLS-VPN service network 215 includes one or more source and destination CE routers 205 and 214 that are coupled to one or more associated source and destination PE routers 210 and 212, respectively. Further as shown in FIG. 2, the block diagram 200 includes a flow record collector that is coupled to the one or more associated source and destination PE routers 210 and 212, respectively. Furthermore as shown in FIG. 2, the block diagram 200 includes a first stage flow record processor 230 that is coupled to the flow record collector 225 and a second stage flow record processor 232. Also shown in FIG. 2 is a VPN provisioning system 220, a VPN database 222, and a VPN route builder 227 that are coupled to a VPN route database 235. In addition as shown in FIG. 2, the block diagram 200 includes an unprocessed flow records database 252 that is coupled to the first and second stage flow record processors 230 and 232, respectively. Moreover as shown in FIG. 2, the block diagram 200 includes an aggregated flow records database 250 that is coupled to the unprocessed flow records database 252 and the second stage flow record processor 232. Also shown in FIG. 2 is a billing system 240 that is coupled to the aggregated flow records database 250.

The processed and aggregated flow records consists of following fields Source CE IP address, destination IP address, Source port number, destination port number, Layer 3 protocol type, Type of Service, Destination PE Interface index, Source PE IP address, Source VPN Site name, Destination PE IP address, Destination VPN Site name.

In operation, the first stage flow record processor 230 computes a source PE IP address and a source PE interface name for each flow record received at one of the one or more source PE routers 210. The first stage flow record processor 230 identifies a source VPN site based on the computed source PE IP address and the source PE interface name of each flow record. The computed and aggregated flow records are then stored in aggregated flow record database 250. The computation of source PE IP address is based on VPN routing information available in VPN route database 235. If the computation fails then unprocessed flow records without the "Source PE IP address" and "Source VPN Site name" fields are placed in "unprocessed flow records database" 252. In these embodiments, the first stage flow record processor 230 stores the unprocessed flow records in the unprocessed flow records database 252. The second stage flow record processor 232 then retrieves the unprocessed flow records from the unprocessed flow records database 252 periodically in a batch mode and computes the source PE IP address and the source VPN site by querying the VPN route database 235.

The VPN route builder 227 queries the VPN provisioning system database 222 and an associated one of the one or more PE routers 212 to obtain a VPN site name, a source PE router IP address, source VPN routing information and interface name associated with each VRF name. The VPN router builder 227 then forms the VPN route database 235 using the obtained VPN site name, the source PE router IP address, the VPN routing information and the interface name associated with each VRF name.

In some embodiments, the VPN router builder 227 queries the VPN provisioning system database 222 to retrieve VRF names and associated source PE router IP addresses, source VPN site names and source PE interface names. The VPN route builder 227 further queries one of the one or more source PE routers 210 associated with a retrieved source PE router IP address for each VRF name to retrieve VPN routing information associated with each one of connected routes in the MPLS-VPN network 215. The VPN route builder 227 then obtains the VPN site name, the PE router IP address, the PE interface name, and VPN routing information associated with each VRF name. The VPN route builder 227 then stores the VPN site name, the PE router IP address, the VPN routing information and the PE interface name associated with each VRF name in the VPN route database 235.

The second stage flow record processor 232 retrieves unprocessed flow records from unprocessed flow record database 252 in a batch mode and computes the "source PE IP address" and the "source VPN site" by querying the VPN route database 235. The processed flow records are then stored in aggregated flow records database 250 and purged from the unprocessed flow records database 252.

The flow record collector 225 then captures destination flow records from all the source PE routers 210. The second stage flow record processor 232 then aggregates the destination flow records based on a source CE IP address and the VPN site name. The second stage flow records processor 232 then determines the source PE IP address and the source PE interface name from the VPN route database 235 using the source PE IP address and the source PE interface name from the VPN route database using the source CE IP address and the VPN site name. The second stage flow record processor 232 queries the VPN provisioning system database 222 with the source PE IP address and the source PE interface name to retrieve associated source VPN site name. The second stage flow record processor 232 then enriches each flow record by adding the associated source PE IP address, the destination PE IP address, the VPN site name, the source VPN site name, the source PE interface name and the destination PE interface name if the associated VPN routing information is available.

The operation of the MPLS-VPN network 200 to capture site-to-site traffic data is explained in more detail with reference to FIG. 1.

Various embodiments of the present subject matter can be implemented in software, which may be run in the environment shown in FIG. 3 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 3:
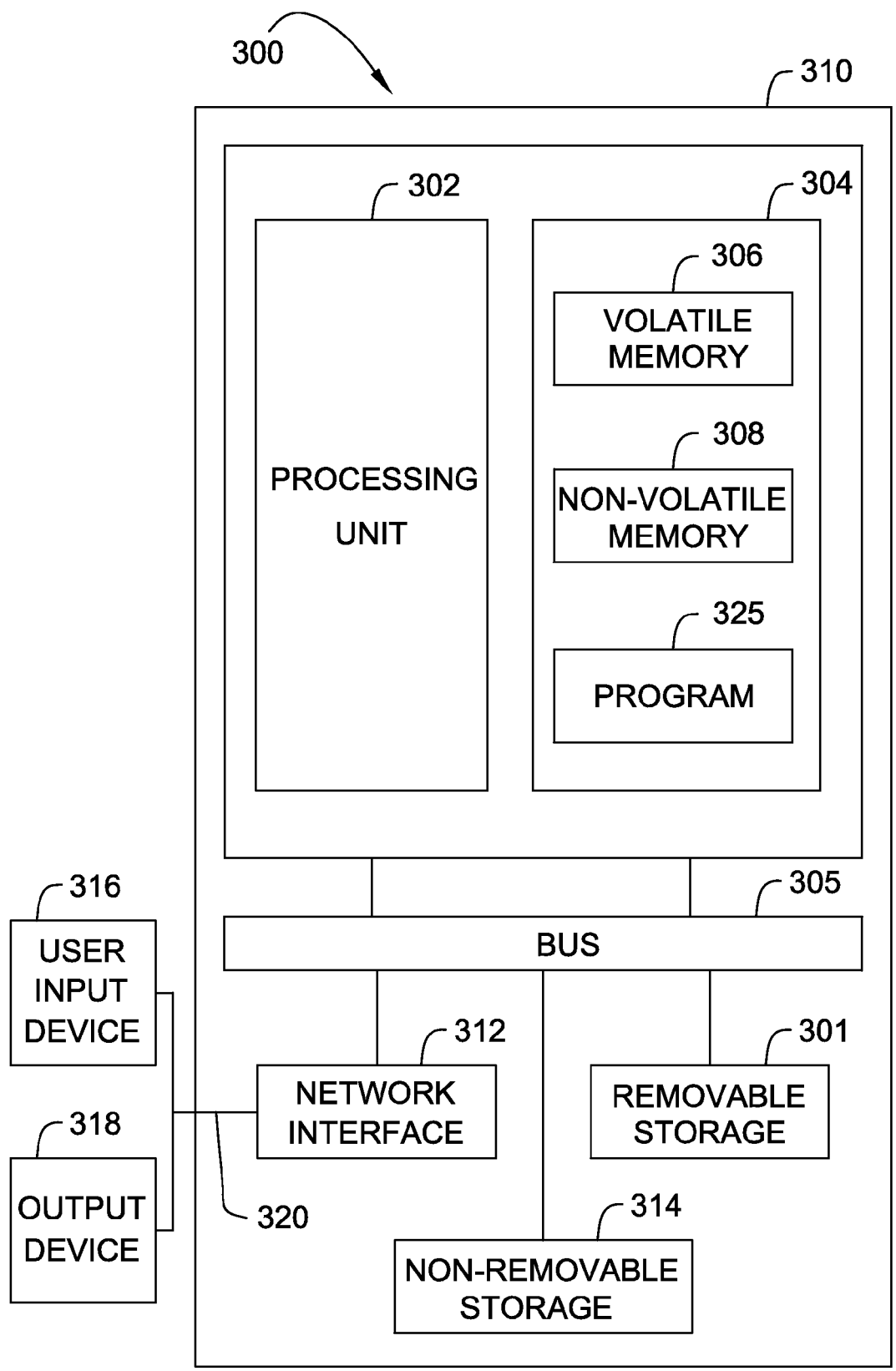
FIG. 3 is a block diagram of a typical computer system used for implementing embodiments of the present subject matter shown in FIGS. 1-2.

FIG. 3 shows an example of a suitable computing system environment for implementing embodiments of the present subject matter. FIG. 3 and the following discussion are intended to provide a brief, general description of a suitable computing environment in which certain embodiments of the inventive concepts contained herein may be implemented.

A general computing device, in the form of a computer 310, may include a processor 302, memory 304, removable storage 301, and non-removable storage 314. Computer 310 additionally includes a bus 305 and a network interface 312.

Computer 310 may include or have access to a computing environment that includes one or more user input modules 316, one or more output modules 318, and one or more communication connections 320 such as a network interface card or a USB connection. The one or more output devices 318 can be a display device of computer, computer monitor, TV screen, plasma display, LCD display, display on a digitizer, display on an electronic tablet, and the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 301 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™ and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a program module 325 may include machine-readable instructions capable of capturing site-to-site traffic data in a computer network according to the teachings and herein described embodiments of the present subject matter. In one embodiment, the program module 325 may be included on a CD-ROM and loaded from the CD-ROM to a hard drive in non-volatile memory 308. The machine-readable instructions cause the computer 310 to encode according to the various embodiments of the present subject matter.

The operation of the computer system 300 for capturing site-to-site traffic data in an MPLS-VPN computer network is explained in more detail with reference to FIG. 1.

The above-described technique requires enabling only egress flow traffic on PE routers, thereby significantly reducing the process load on the routers. Further, the above technique is based on individual flow records; hence a distributed usage mediation solution can be built. Furthermore, network supported data is generally readily available in local data base. The above-described technique significantly improves the performance of usage mediation function in capturing site-to-site traffic data. In addition, the above-described process effectively applies MPLS scalability features as each PE stores routing information of only those VPNs supported by the associated PE router. This reduces the amount of time required to search for PE router as the search can be limited to only those that are supported by the VPNs. Also, the performance tools can also build trend reports for site-to-site traffic utilization based on additional fields in flow records. For external VPNs, where the customer site(s) that are exposed to other customer site(s), the site-to-site traffic data captured using above technique allows one customer to bill other customers.

The above-described technique provides the flexibility to service provides to be able to charge VPN customers based on their site-to-site usage and/or based on their Link usage rather than a fixed traffic or per site basis. Further for VPN customers, the above technique provides information for capacity planning for network planning purposes. Furthermore, for VPN customers supporting extranet service the above technique can be used to charge them on usage basis as well.

Although, the above example embodiments shown in FIGS. 1-3 are explained with reference to MPLS/VPN network, the above-described technique is not limited to only MPLS/VPN network, but it can be used within any network environment where source information of a flow record is not available and has to be computed based on routing information.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-3 are merely representational and are not drawn to scale. Certain proportions thereof may be exaggerated, while others may be minimized. FIGS. 1-3 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method for capturing site-to-site traffic data in Multiprotocol Label Switching-Virtual Private Network (MPLS-VPN) based networks comprising:
    computing a source Provider Edge (PE) IP address and a source PE interface name for each flow record captured at a destination PE router, wherein each flow record includes a traffic record of IP packets traversing from a source PE router to the destination PE router in the MPLS-VPN network, and wherein computing the source PE IP address and source PE interface name comprises:
        querying a VPN provisioning system database to retrieve Virtual Route Forward (VRF) names;
        querying the VPN provisioning system database and an associated PE router to obtain a VPN site name, a PE router IP address, VPN routing information and interface name associated with each VRF name for each flow record;
        forming a VPN route database using the obtained VPN site name, PE router IP address, VPN routing information and interface name; and
        dynamically updating each flow record with the source VPN site information by using the VPN route database; and
    identifying a source VPN site by querying the VPN provisioning system database and the associated PE router based on the computed source PE IP address and the source PE interface name for each flow record traversing from the source PE router to the destination PE router, and wherein the source VPN site accesses the MPLS-VPN network through the source PE router.

2. The method of claim 1, wherein forming the VPN route database comprises:
    querying the VPN provisioning system database to retrieve the VRF names and associated PE router IP addresses, VPN site names and PE interface name fields related to any desired VPNs;
    querying a PE router associated with a retrieved PE router IP address for each VRF name to retrieve VPN routing information associated with directly connected routes;
    obtaining the VPN site name, the PE router IP address, the PE interface name, and VPN routing information associated with each VRF name; and
    storing the VPN site name, the PE router IP address, the VPN routing information and the PE interface name associated with each VRF name in the VPN route database.

3. The method of claim 2, wherein dynamically updating each flow record comprises:
- capturing flow records from all destination interfaces of PE routers associated with the MPLS-VPN network by a first stage flow record processor via a flow record collector;
- querying the VPN provisioning system database using the destination PE IP address and destination PE Interface name associated with each captured destination flow record to retrieve associated destination VPN site name and VPN name;
- aggregating the flow records based on a source Consumer Edge (CE) IP address and the retrieved VPN name;
- determining the source PE IP address and the source PE interface name from the VPN route database using the source CE IP address and the retrieved VPN name;
- querying the VPN provisioning system database with the source PE IP address and the source PE interface name to retrieve associated source VPN site name; and
- enriching each flow record by adding the associated source PE IP address, the destination PE IP address, the destination VPN site name, the source VPN site name, the source PE interface name and the destination PE interface name, if routing information is available.

4. The method of claim 3, further comprising:
- tagging each flow record with a unprocessed label, if associated routing information is not available; and
- batch processing all flow records labeled as unprocessed flow records during a predetermined period to update with any available VPN site information.

5. An article comprising:
- a storage medium having instructions that, when executed by a computing platform, result in execution of a method for capturing traffic data between two Multiprotocol Label Switching-Virtual Private Network (MPLS-VPN) based networks comprising:
  - computing a source Provider Edge (PE) IP address and a source PE interface name for each flow record captured at a destination PE router, wherein each flow record includes a traffic record of IP packets traversing from a source PE router to the destination PE router in the MPLS-VPN network, and wherein computing the source PE IP address and source PE interface name comprises:
    - querying a VPN provisioning system database to retrieve Virtual Route Forward (VRF) names;
    - querying the VPN provisioning system database and an associated PE router to obtain a VPN site name, a PE router IP address, VPN routing information and interface name associated with each VRF name for each flow record;
    - forming a VPN route database using the obtained VPN site name, PE router IP address, VPN routing information and interface name; and
    - dynamically updating each flow record with the source VPN site information by using the VPN route database; and
  - identifying a source VPN site by querying the VPN provisioning system database and the associated PE router based on the computed source PE IP address and the source PE interface name for each flow record traversing from the source PE router to the destination PE router, and wherein the source VPN site accesses the MPLS-VPN network through the source PE router.

6. The article of claim 5, wherein forming the VPN route database comprises:
- querying the VPN provisioning system database to retrieve the VRF names and associated PE router IP addresses, VPN site names and PE interface name fields related to any desired VPNs;
- querying a PE router associated with a retrieved PE router IP address for each VRF name to retrieve VPN routing information associated with directly connected routes;
- obtaining the VPN site name, the PE router IP address, the PE interface name, and VPN routing information associated with each VRF name; and
- storing the VPN site name, the PE router IP address, the VPN routing information and the PE interface name associated with each VRF name in the VPN route database.

7. The article of claim 6, wherein dynamically updating each flow record comprises:
- capturing flow records from all destination interfaces of PE routers associated with the MPLS-VPN network by a first stage flow record processor via a flow record collector;
- querying the VPN provisioning system database using the destination PE IP address and destination PE Interface name associated with each captured destination flow record to retrieve associated destination VPN site name and VPN name;
- aggregating the flow records based on a source Consumer Edge (CE) IP address and the retrieved VPN name;
- determining the source PE IP address and the source PE interface name from the VPN route database using the source CE IP address and the retrieved VPN name;
- querying the VPN provisioning system database with the source PE IP address and the source PE interface name to retrieve associated source VPN site name; and
- enriching each flow record by adding the associated source PE IP address, the destination PE IP address, the destination VPN site name, the source VPN site name, the source PE interface name and the destination PE interface name, if routing information is available.

8. The article of claim 7, further comprising:
- tagging each flow record with a unprocessed label, if associated routing information is not available; and
- batch processing all flow records labeled as unprocessed flow records during a predetermined period to update with any available VPN site information.

9. An Multiprotocol Label Switching-Virtual Private Network (MPLS-VPN) network, comprising:
- a first stage flow record processor;
- a second stage flow record processor; and
- one or more VPNs that comprise:
  - one or more source and destination Provider Edge (PE) routers that are coupled to a MPLS/VPN network; and
  - one or more associated Consumer Edge (CE) routers that are coupled to the associated PE routers, wherein the first stage flow record processor computes a source PE IP address and a source PE interface name for each flow record captured at one of the one or more destination PE routers, wherein each flow record includes a traffic record of IP packets traversing from a source PE router to the one of the one or more destination PE routers in the MPLS-VPN network, and wherein the first stage flow record processor identifies a source Virtual Private network (VPN) site by querying a VPN provisioning system database and an associated one of the one or more destination PE routers based on the computed source PE IP address and the source PE interface name for each flow record traversing from the source PE router to the destination PE router, and wherein the source VPN site accesses the MPLS-VPN network through the source PE router;

a VPN route database; and the VPN provisioning system database, wherein the VPN route builder queries the VPN provisioning system database to retrieve Virtual Route Forward (VRF) names, queries the VPN provisioning system database and the associated one of the one or more destination PE routers to obtain a VPN site name, a source PE router IP address, VPN routing information and interface name associated with each Virtual Route Forward (VRF) name for each flow record, and wherein the VPN route builder forms the VPN route database using the obtained VPN site name, the source PE router IP address, the VPN routing information and the interface name associated with each VRF name.

10. The service network of claim 9, wherein the VPN route builder queries the VPN provisioning system database to retrieve the VRF names and associated source PE router IP addresses, source VPN site names and source PE interface names, and wherein the VPN route builder further queries one of the one or more source PE routers associated with a retrieved source PE router IP address for each VRF name to retrieve VPN routing information associated with each one of connected routes, wherein the VPN route builder obtains the VPN site name, the PE router IP address, the PE interface name, and VPN routing information associated with each VRF name, and wherein the VPN route builder stores the VPN site name, the PE router IP address, the VPN routing information and the PE interface name associated with each VRF name in the VPN route database.

11. The service network of claim 10, further comprising:
an unprocessed flow records database; and
an aggregated flow records database, wherein the second stage flow record processor forms the aggregated flow records database using unprocessed flow records retrieved from the unprocessed flow records database and updates the VPN route database.

12. The service network of claim 11, further comprising:
a flow record collector, wherein the flow record collector captures destination flow records from all source PE routers, wherein the second stage flow record processor aggregates the destination flow records based on a source CE IP address and the VPN site name, wherein the second stage flow record processor determines the source PE IP address and the source PE interface name from the VPN route database using the source CE IP address and the VPN site name, wherein the second stage flow record processor queries the VPN provisioning system database with the source PE IP address and the source PE interface name to retrieve associated source VPN site name, and wherein the second stage flow record processor enriches each flow record by adding the associated source PE IP address, the destination PE IP address, the VPN site name, the source VPN site name, the source PE interface name and the destination PE interface name, if the associated VPN routing information is available.

13. A computer system comprising:
a computer network, wherein the computer network has a plurality of network elements, and wherein the plurality of network elements has a plurality of network interfaces;
a network interface;
an input module coupled to the network interface that receives topology data via the network interface;
a processing unit; and
a memory coupled to the processor, the memory having stored therein code associated with provisioning one or more firewalls associated with one or more Virtual Private networks (VPNs) in an Multiprotocol Label Switching-Virtual Private Network (MPLS-VPN) network, the code causes the processor to perform a method comprising:
computing a source Provider Edge (PE) IP address and a source PE interface name for each flow record captured at a destination PE router, wherein each flow record includes a traffic record of IP packets traversing from a source PE router to the destination PE router in the MPLS-VPN network, and wherein computing the source PE IP address and source PE interface name comprises:
querying a VPN provisioning system database to retrieve Virtual Route Forward (VRF) names;
querying the VPN provisioning system database and an associated PE router to obtain a VPN site name, a PE router IP address, VPN routing information and interface name associated with each VRF name for each flow record;
forming a VPN route database using the obtained VPN site name, PE router IP address, VPN routing information and interface name; and
dynamically updating each flow record with the source VPN site information by using the VPN route database; and
identifying a source VPN site by querying the VPN provisioning system database and the associated PE router based on the computed source PE IP address and the source PE interface name for each flow record traversing from the source PE router to the destination PE router, and wherein the source VPN site accesses the MPLS-VPN network through the source PE router.

14. The system of claim 13, wherein forming the VPN route database comprises:
querying the VPN provisioning system database to retrieve the VRF names and associated PE router IP addresses, VPN site names and PE interface name fields related to any desired VPNs;
querying a PE router associated with a retrieved PE router IP address for each VRF name to retrieve VPN routing information associated with directly connected routes;
obtaining the VPN site name, the PE router IP address, the PE interface name, and VPN routing information associated with each VRF name; and
storing the VPN site name, the PE router IP address, the VPN routing information and the PE interface name associated with each VRF name in the VPN route database.

15. The system of claim 14, wherein dynamically updating each flow record comprises:
capturing flow records from all destination interfaces of PE routers associated with the MPLS-VPN network by a first stage flow record processor via a flow record collector;
querying the VPN provisioning system database using the destination PE IP address and destination PE Interface name associated with each captured destination flow record to retrieve associated destination VPN site name and VPN name;
aggregating the flow records based on a source Consumer Edge (CE) IP address and the retrieved VPN name;

determining the source PE IP address and the source PE interface name from the VPN route database using the source CE IP address and the retrieved VPN name;

querying the VPN provisioning system database with the source PE IP address and the source PE interface name to retrieve associated source VPN site name; and enriching each flow record by adding the associated source PE IP address, the destination PE IP address, the destination VPN site name, the source VPN site name, the source PE interface name and the destination PE interface name, if routing information is available.

16. The system of claim 15, further comprising:

tagging each flow record with a unprocessed label, if associated routing information is not available; and batch processing all flow records labeled as unprocessed flow records during a predetermined period to update with any available VPN site information.

* * * * *